(12) United States Patent
Akutsu et al.

(10) Patent No.: US 10,740,189 B2
(45) Date of Patent: Aug. 11, 2020

(54) DISTRIBUTED STORAGE SYSTEM

(71) Applicant: HITACHI, LTD., Tokyo (JP)

(72) Inventors: Hiroaki Akutsu, Tokyo (JP); Yoshinori Oohira, Tokyo (JP); Takahiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 223 days.

(21) Appl. No.: 15/762,416

(22) PCT Filed: Nov. 10, 2015

(86) PCT No.: PCT/JP2015/081606
§ 371 (c)(1),
(2) Date: Mar. 22, 2018

(87) PCT Pub. No.: WO2017/081747
PCT Pub. Date: May 18, 2017

(65) Prior Publication Data
US 2018/0293137 A1    Oct. 11, 2018

(51) Int. Cl.
*G06F 11/14* (2006.01)
*G06F 16/23* (2019.01)
(Continued)

(52) U.S. Cl.
CPC ...... *G06F 11/1464* (2013.01); *G06F 11/1076* (2013.01); *G06F 11/1451* (2013.01);
(Continued)

(58) Field of Classification Search
None
See application file for complete search history.

(56) References Cited

U.S. PATENT DOCUMENTS

| 7,152,079 B2 | 12/2006 | Hirakawa et al. |
| 9,519,540 B2 * | 12/2016 | Atkisson ............... G06F 11/108 |
| 2013/0060819 A1 * | 3/2013 | Lambeth ............. H04L 12/4633 |
| | | 707/803 |

FOREIGN PATENT DOCUMENTS

JP    2012-033169 A    2/2012

OTHER PUBLICATIONS

Akutsu et al. "Reliability Analysis of highly Redundant Distributed Storage Systems with Dynamic Refuging", 2015 23rd Euromicro International Conference on Parallel, Distributed and Network-Based Processing, 2015 IEEE Mar. 4, 2015.

(Continued)

*Primary Examiner* — Tuankhanh D Phan
(74) *Attorney, Agent, or Firm* — Volpe and Koenig, P.C.

(57) ABSTRACT

A distributed storage system includes an edge system including edge nodes, and a core system, which is coupled to the edge system via a network, and is configured to hold backup data of the edge system. Each of the edge nodes is configured to provide a volume to a host, generate XOR update differential data representing a differential between a first generation snapshot of the volume and an old generation snapshot of the volume, the old generation being older than the first generation, and transmit the generated XOR update differential data to the core system. The core system is configured to hold, as the backup data, erasure codes generated based on pieces of XOR update differential data transmitted from the edge nodes, and update the erasure codes based on the pieces of XOR update differential data received from the edge nodes.

14 Claims, 13 Drawing Sheets

(51) Int. Cl.
  *G06F 11/30* (2006.01)
  *G06F 11/20* (2006.01)
  *G06F 11/10* (2006.01)

(52) U.S. Cl.
  CPC ...... *G06F 11/1469* (2013.01); *G06F 11/2094* (2013.01); *G06F 11/3006* (2013.01); *G06F 11/3034* (2013.01); *G06F 11/3055* (2013.01); *G06F 16/2379* (2019.01); *G06F 2201/84* (2013.01)

(56) References Cited

OTHER PUBLICATIONS

International Search Report dated Dec. 22, 2015 of the PCT International Application No. PCTJP2015/081606.

\* cited by examiner

| | 311 | 312 | 313 | 314 | 315 | 316 |
|---|---|---|---|---|---|---|
| | VOL# | VOL TYPE | STATE | PAIR VOL # | PAIR # | PORT |
| | 0x0100 | PVOL | - | 0x0200,0x0201 | 0x00,0x01 | CL1-A |
| | 0x0200 | SVOL | CURRENT | - | | - |
| | 0x0201 | SVOL | OLD | - | | - |
| | 0x0300 | BVOL | ALL WRITES COMPLETED | | | |
| | | | | | | |
| | | | | | | |

VOLUME CONFIGURATION TABLE 301

FIG.4A

| | 321 | 322 | 323 |
|---|---|---|---|
| | PAIR # | PAIR STATE | EVACUATION COMPLETION BITMAP |
| | 0x00 | Split | 010100101··· |
| | 0x01 | Pair | - |
| | | | |
| | | | |
| | | | |
| | | | |

PAIR MANAGEMENT TABLE 302

FIG.4B

| 331 | 332 | 333 | 334 |
|---|---|---|---|
| VIRTUAL VOL # | LBA# | LOGICAL VOL # | LBA# |
|  |  |  |  |
|  |  | - | - |
|  |  |  |  |
|  |  |  |  |
|  |  |  |  |
|  |  |  |  |

PAGE MAPPING TABLE 303

FIG.4C

| 391 | 392 | 393 |
|---|---|---|
| BASE NUMBER | BASE STATE | REFERENCE TO VOLUME CONFIGURATION INFORMATION |
| 0x00 | Failure |  |
| 0x01 | Normal |  |
| 0x02 | Disconnected |  |
|  |  |  |
|  |  |  |
|  |  |  |

BASE MANAGEMENT TABL 309

FIG.4D

DISTRIBUTED STORAGE SYSTEM

BACKGROUND

This invention relates to a distributed storage system.

Systems in which generated data are held in a large number of edge nodes to be used in analysis are expected to become popular with the arrival of the IoT era. A system of this type is demanded to back up a large amount of data in edge nodes with few resources.

For example, an asynchronous remote copy technology is disclosed in U.S. Pat. No. 7,152,079 B2 (PTL1). Configurations disclosed therein include the following:

"A first storage system stores information relating to the updating of data stored in that system as a journal. More specifically, the journal is includes a copy of data that was used for updating and update information such as a write command used during updating. Furthermore, the second storage system acquires the journal via a communication line between the first storage system and the second storage system. The second storage system holds a duplicate of the data held by the first storage system and updates the data corresponding to the data of the first storage system in the data update order of the first storage system by using the journal." (Abstract).

The asynchronous remote copy technology described above is capable of preventing the latency of host I/O from increasing, by transferring data to be backed up to a remote data center asynchronously with host I/O.

Patent Literature

PTL1: U.S. Pat. No. 7,152,079 B2

SUMMARY

With the remote copy technology of the related art, a storage apparatus having a capacity large enough for storing actual data is required to be introduced in the backup-side data center in order to duplicate data to be backed up. This means that, when there are a large number of edge nodes, the backup-side data center (core data center) is required to have an enormous capacity.

An aspect of this invention is a distributed storage system, including: an edge system including a plurality of edge nodes; and a core system, which is coupled to the edge system via a network, and is configured to hold backup data of the edge system. Each of the plurality of edge nodes is configured to: provide a volume to a host; generate XOR update differential data representing a differential between a first generation snapshot of the volume and an old generation snapshot of the volume, the old generation being older than the first generation; and transmit the generated XOR update differential data to the core system. The core system is configured to: hold, as the backup data, erasure codes generated based on pieces of XOR update differential data transmitted from the plurality of edge nodes; and update the erasure codes based on the pieces of XOR update differential data received from the plurality of edge nodes.

According to the one embodiment of this invention, the storage capacity necessary for backup can be reduced without compromising data protection that is provided by backup.

BRIEF DESCRIPTION OF THE DRAWINGS

FIG. 4A is a table for showing an example of the volume configuration table, which is used to manage the configuration of a volume.

FIG. 4B is a diagram for illustrating an example of the pair management table, which is used to manage the state of a pair.

FIG. 4C is a table for showing an example of the page mapping table, which is used to manage information about page mapping of a pool.

FIG. 4D is a diagram for illustrating an example of the base management table.

DETAILED DESCRIPTION OF THE EMBODIMENTS

Embodiments of this invention are described below with reference to the accompanying drawings. It should be noted that the embodiments described below are merely examples for implementing this invention and do not limit a technical scope of this invention. Components common across the respective drawings are denoted by the same reference symbols.

This disclosure relates to improving the efficiency of data protection in a distributed storage system distributed among bases. XOR update differential data of snapshots at different points in time (data of a volume at particular time points) is generated and transferred to a core system by a plurality of edge nodes. The core system updates an erasure code (redundancy code) based on the XOR update differential data. The storage capacity for remote backup is reduced in this manner.

First Embodiment

Figure 1:
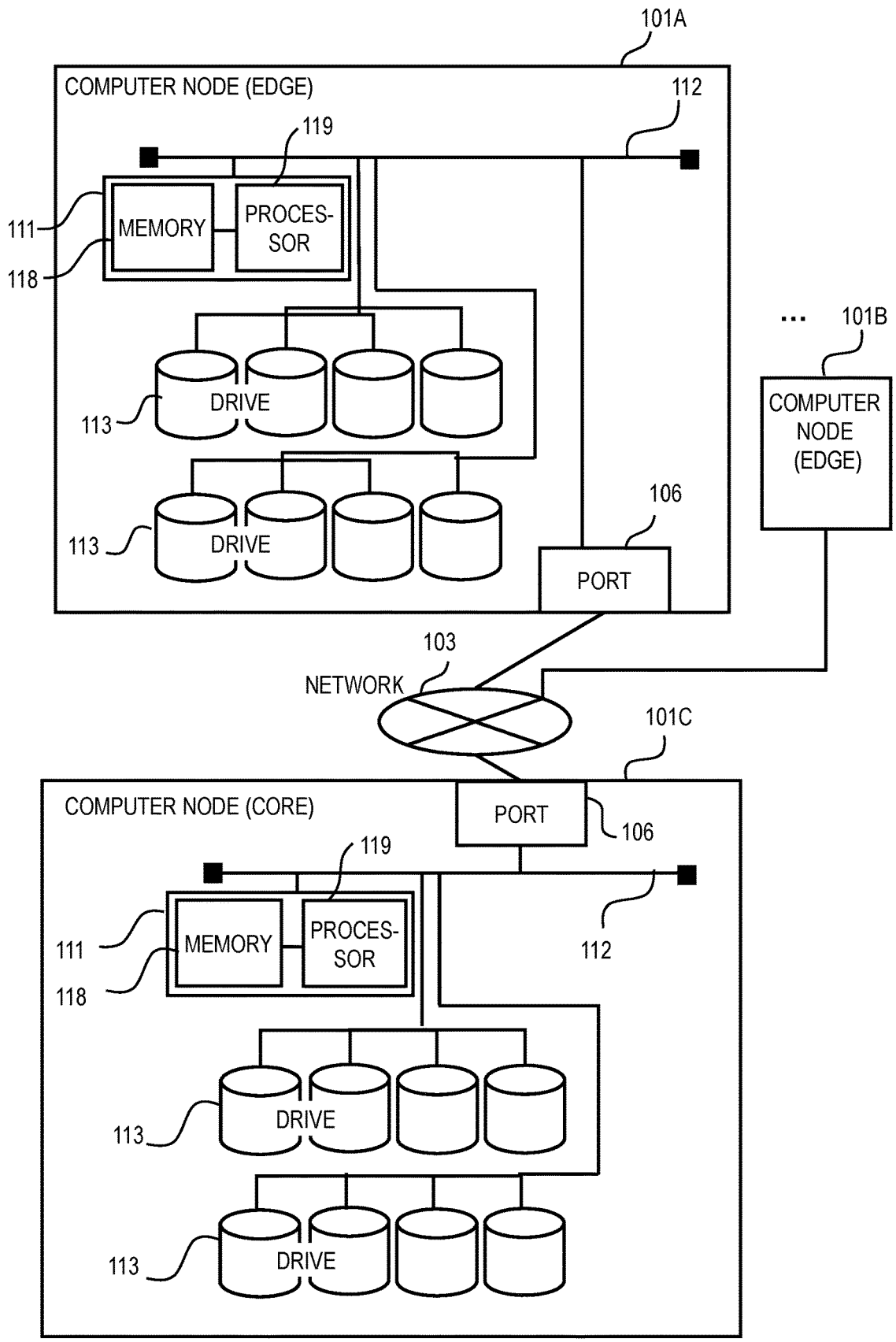
FIG. 1 is a diagram for illustrating an example of the system configuration of a distributed storage system distributed among bases.

FIG. 1 is a diagram for illustrating an example of the system configuration of a distributed storage system distributed among bases. The distributed storage system distributed among bases includes a plurality of computer nodes coupled via a network. Three computer nodes, 101A to 101C, are illustrated as an example in FIG. 1.

The computer nodes 101A and 101B are edge nodes (also simply referred to as "edges"), and the computer node 101C is a core node (also simply referred to as "core"). The edge nodes 101A and 101B each provide volumes to a host, and the core node 101C holds backup data of volumes of the edge nodes 101A and 101B. The edge nodes are placed in different bases, for example, different branches.

The computer nodes have the configuration of, for example, a general server computer. There are no particular limitations on the hardware configuration of the computer nodes. One computer node is coupled to the other computer nodes via a network 103 and a port 106. The network 103 is constructed from, for example, an InfiniBand network or an Ethernet network.

The internal configuration of the computer nodes includes the port 106, a processor package 111, and disk drives (also referred to as "drives" in the following description) 113, which are coupled to one another via an internal network 112. The processor package 111 includes a memory 118 and a processor 119.

The memory 118 stores control information necessary for the processor 119 to execute functions of the storage by processing a read command and a write command. The memory 118 also stores cache data of the storage. The memory 118 further stores, for example, a program executed by the processor 119. The memory 118 may be a volatile DRAM, a non-volatile storage class memory (SCM), or the like.

The drives 113 include, for example, hard disk drives (HDDs), or solid state drives (SSDs) having an interface for Fibre Channel (FC), Serial Attached SCSI (SAS), or Serial Advanced Technology Attachment (SATA), or other standards.

The SCM used may be a NAND, a PRAM, a ReRAM, or the like, or a volatile memory may be used. When a volatile memory is used, the storage device may be made non-volatile with the use of a battery. The drives of various types given above differ from one another in performance. For example, SSDs are higher in throughput performance than HDDs. The computer nodes each include the drives 113 of a plurality of types.

Figure 2:
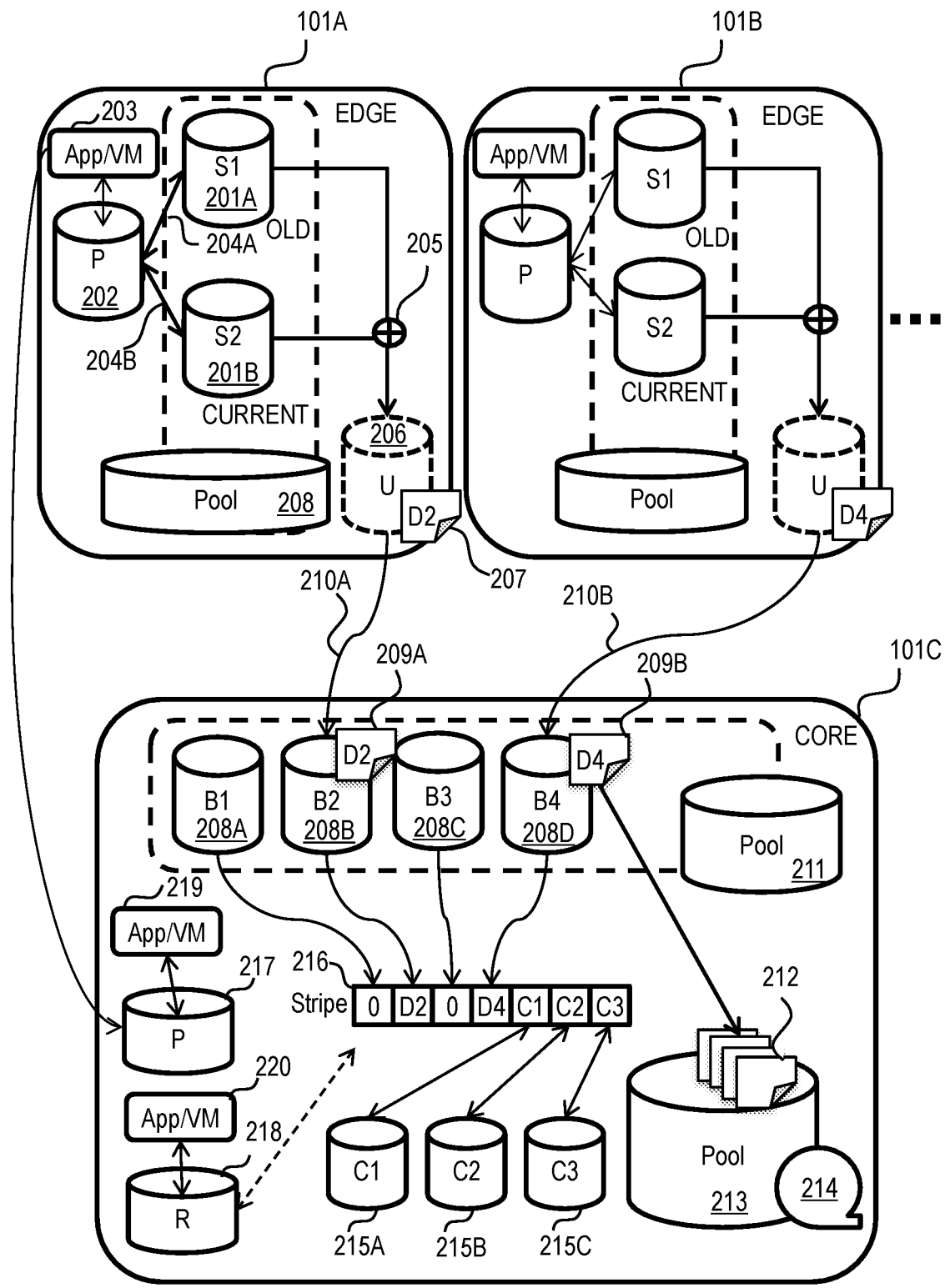
FIG. 2 is a diagram for illustrating an example of the logical configuration of the distributed storage system distributed among bases.

FIG. 2 is a diagram for illustrating an example of the logical configuration of the distributed storage system distributed among bases. The distributed storage system distributed among bases includes an edge system, which includes the computer nodes 101A and 101B, and a core system, which includes the computer node 101C. Reference symbols assigned to components of the computer node 101B that are of the same types as components of the computer node 101A are omitted from FIG. 2. The computer nodes of the edge system are distributed among a plurality of bases. One or more computer nodes are placed in one base.

The computer nodes 101A and 101B each provide a primary volume PVOL 202 to a host. The host is, for example, an application or virtual machine (App/VM) 203 run on the edge computer. The application program or the virtual machine program may be run on another computer, or the host may be another physical computer.

The PVOL 202 may be a virtual volume or a logical volume. A virtual volume is a volume that has no physical storage space. The computer node allocates a logical page from a pool to a virtual page that is newly accessed for a write operation. A pool is made up of one or more pool volumes. A pool volume is a logical volume, and a logical storage area of a pool volume is allocated a physical storage area of a parity group of the drives 113.

Two secondary volumes, SVOLs 201A (S1) and 201B (S2), are associated with one PVOL 202. The PVOL 202 and the SVOL 201A form a snapshot pair 204A. The PVOL 202 and the SVOL 201B form a snapshot pair 204B.

"Snapshot" or "snapshot data" refers to data of a PVOL at a particular time point, and means a stilled image of the PVOL at the particular time point. Data of the SVOL 201A and data of the SVOL 201B are consistent pieces of image data at different particular time points of the PVOL 202, and are obtained by a snapshot function.

The snapshot function copies, to an SVOL, prior to an update, only a portion of snapshot data that has been updated since a particular time point (pre-update data) out of data in the PVOL. In other words, out of snapshot data of the PVOL at a particular time point, only snapshot data in an area updated since the particular time point is copied to an SVOL. Differential data that is a differential between a snapshot of the PVOL at a particular time point and an update made to the PVOL since then is written to an SVOL in this manner.

In the example of FIG. 2, the SVOLs 201A and 201B are virtual volumes to which a physical storage area is allocated from a pool 208 on a page-by-page basis. Each page has a given size. In other words, data of the SVOL 201A and data of the SVOL 201B are stored in the pool 208 to be managed. The SVOLs 201A and 201B may be volumes of other types.

When the PVOL is updated, only data of a portion to be updated is copied to the pool as (part of) snapshot data prior to the update. This processing is also called obtaining snapshot data.

An example of the operation of obtaining snapshot data in the snapshot pair 204A is described. Data A is found in the PVOL 202 at a particular time point as stored data. When the computer node 101A receives from the host a write command (write request) demanding an update of the data A with data B after the particular time point, before updating the PVOL 202, the computer node 101A copies the data A to the SVOL 201A, namely, the pool 208.

After the copying of the data A is finished, the computer node 101A writes the data B in an area of the PVOL 202 in which the data A is stored, thereby updating the PVOL 202. The host can obtain data of the PVOL 202 at the particular point by accessing the PVOL 202 and the pool 208 via the SVOL 201A.

The PVOL 202 continues I/O to/from the host and receives update write in this manner. Data of the SVOL 201A and data of the SVOL 201B, on the other hand, remain the same as the corresponding data at the particular time point.

The SVOLs 201A and 201B can be in a "current" state or an "old" state. One of the SVOLs 201A and 201B is in the "current" state and the other is in the "old" state. In FIG. 2, the SVOL 201A is in the "old" state and the SVOL 201B is in the "current" state. The SVOL 201A in the "old" state is associated with data one generation before that of the SVOL 201B in the "current" state.

The particular time point of an SVOL in the "old" state precedes the particular time point of an SVOL in the "current" state. For example, the particular time point of the SVOL 201A in the "old" state is 9:00 on 14th while the particular time point of the SVOL 201B in the "current" state is 10:00 on 14th.

The core node 101C generates an erasure code (EC) for the "old" generation data, and the erasure code is already stored (reflected) in the drives 113. The erasure code is backup data of the PVOL 202. An erasure code for the "current" generation data, on the other hand, is not finished being reflected on the drives 113 of the core node 101C, and has not started being reflected or is being reflected. The core node 101C uses, for example, the Reed-Solomon code to generate an erasure code.

Each edge node, for example, the computer node 101A, calculates an exclusive-OR XOR (205) of the SVOLs 201A and 201B with respect to an area of the PVOL 202 to which a write update is made, and writes to an internal volume UVOL 206 on which an external volume is mapped. The exclusive-OR XOR data of different generations of snapshot data is referred to as "XOR update differential data".

Specifically, the computer node 101A obtains data evacuated (copied) from the PVOL 202 to the SVOL 201A in the "old" state, and data in the same address area of the SVOL 201B in the "current" state. The computer node 101A calculates the exclusive-OR XOR of the two obtained pieces of data of the SVOLs 201A and 201B to obtain XOR update differential data. The calculated data is thus XOR update differential data of successive generations. The computer node 101A writes the calculated XOR update differential data to the UVOL 206.

XOR update differential data 207 in FIG. 2 represents all pieces of XOR update differential data written to the UVOL 206 in a particular period at different addresses. In FIG. 2, the XOR update differential data (D2) 207 is written to the UVOL 206 of the computer node 101A, and the XOR update differential data (D4) 207 is written to the UVOL 206 of the computer node 101B.

Buffer volumes BVOLs of the core node 101C are mapped onto the UVOLs 206. The BVOLs are mapped as internal volumes of the edge nodes, and each edge node can access a corresponding BVOL via its UVOL 206.

In FIG. 2, a BVOL (B2) 208B is mapped onto the UVOL 206 of the computer node 101A, and a BVOL (B4) 208D is mapped onto the UVOL 206 of the computer node 101B. BVOL (B1) 208A and BVOL (B3) 208C are also separately mapped onto the UVOLs 206 inside other edge nodes. When an edge node writes data at an address in its UVOL 206, the written data is transferred to the core node 101C to be written at a corresponding address in the relevant BVOL.

For instance, in FIG. 2, the XOR update differential data (D2) 207 in the UVOL 206 of the computer node 101A is transferred to the core node 101C (210A) to be written as XOR update differential data (D2) 209A to the BVOL (B2) 208B. Similarly, the XOR update differential data (D4) 207 in the UVOL 206 of the computer node 101B is transferred to the core node 101C (210B) to be written as XOR update differential data (D4) 209B to the BVOL (B4) 208D.

The BVOLs may be logical volumes or, as is the case for the SVOLs, may be virtual volumes. When the BVOLs are virtual volumes, physical storage areas in the core system can be utilized efficiently. The BVOLs 208A to 208D in the example of FIG. 2 are virtual volumes of a pool 211. When a page (an address area of a given size) in the virtual volumes on which data is not written yet is newly accessed for a write operation, a physical storage area is allocated to the page from the pool 211.

After XOR update differential data is written to some or all of the BVOLs) 208A to 208D, the core node 101C starts erasure code update processing (EC update processing) for a corresponding stripe 216. A stripe is made up of data of a particular BVOL set and erasure codes generated from the data. In other words, a stripe is made up of erasure codes (redundancy codes) for data protection and a plurality of data elements from which the erasure codes are generated.

In FIG. 2, the BVOLs 208A to 208D form a set that is a constituent of the stripe 216. Data elements of the BVOLs 208A to 208D in the same address area are included in the same stripe. Three erasure codes are generated from four data elements in the example of FIG. 2. The number of erasure codes to be generated is one or more.

The BVOLs 208A to 208D each store XOR update differential data of the associated PVOL 202 in a certain period, namely, data that is obtained by XOR calculation of pieces of data updated between successive generations. While only two SVOLs are provided for one PVOL in the example of FIG. 2, a snapshot pair may be formed from three or more SVOLs. The certain period is common to or varies among different PVOLs.

After the EC update processing, the BVOLs are initialized as described later. Consequently, XOR update differential data is stored at some addresses in the BVOLs while unused area data (zero data) is stored at other addresses. The address at which the XOR update differential data is stored varies from one BVOL to another.

In the example of FIG. 2, the BVOL (B2) 208B and the BVOL (B4) 208D store the XOR update differential data (D2) 209A and the XOR update differential data (D4) 209B, respectively, and have already received an all-writes-complete notification, which is described later. No XOR update differential data is stored in the BVOL (B1) 208A and the BVOL (B3) 208C.

Data elements corresponding to the BVOL (B1) 208A and the BVOL (B3) 208C are always zero data in the stripe 216 of FIG. 2. Data elements from the BVOL (B2) 208B and the BVOL (B4) 208D are data stored in the BVOL (B2) 208B and data stored in the BVOL (B4) 208D, which are zero data or XOR update differential data.

In this manner, when already received XOR update differential data is only XOR update differential data of some PVOL of the stripe, the need to wait for XOR update differential data of another PVOL is eliminated by setting zero data as a data element of a BVOL that has not received an all-writes-complete notification. Each edge node can transmit XOR update differential data to the core system at timing independent of the transmission timing of other edge nodes.

The core node 101C provides volumes CVOLs 215A, 215B, and 215C in each of which a generated erasure code is stored. Erasure codes C1, C2, and C3 stored in the CVOLs 215A, 215B, and 215C, respectively, are updated by a read-modify-write operation. When the erasure codes C1, C2, and C3 are updated, exclusive lock is set on areas of the CVOLs 215A, 215B, and 215C in which the erasure codes C1, C2, and C3 are stored to prohibit write and read operations. This ensures that all erasure codes in the stripe are updated simultaneously for the same data element.

In EC update, the core node 101C reads immediately preceding erasure codes in the stripe 216 out of the CVOLs 215A, 215B, and 215C. The core node 101C generates new erasure codes from the read erasure codes and new data elements, which include XOR update differential data received from the edge system. The new erasure codes are used to update the corresponding erasure codes in the CVOLs 215A to 215C.

An erasure code is updated by a read-modify-write operation with the use of XOR update differential data elements received from the edge system and representing a differential between generations. Only data evacuated to an SVOL in an edge node, in this example, the "old" SVOL, namely, XOR update differential data of an address area updated in the PVOL 202, is transferred from the edge system to the core node 101C. This reduces the amount of data transferred.

An erasure code is updated sequentially with XOR update differential data representing a differential between generations. The latest updated erasure code is accordingly an erasure code corresponding to snapshot data of the latest generation among generations of snapshot data of the relevant PVOL that have been transmitted to the core system. The latest updated erasure code is also an erasure code of XOR update differential data that is a differential between zero data and snapshot data of the "old" SVOL's generation in an edge node of the relevant PVOL.

The core node 101C may keep a backup of sequentially received pieces of snapshot data spanning a plurality of generations in addition to erasure codes. The core node 101C in FIG. 2 holds, in a pool 213, the XOR update differential data 209B on the BVOL (B4) 208D for each generation.

The pool 213 stores, similarly to the snapshot pool 208, only XOR update differential data 212 representing a differential between generations. The core node 101C sequentially adds to the XOR update differential data 212 representing a differential between generations. This data is backup data that is infrequently referred to, and may accordingly be stored on a tape device 214.

When a failure occurs in one of the edge nodes, the core node 101C generates an image RVOL 218 of consistent backup data of the PVOL 202 from erasure codes in the CVOLs and SVOL data obtained from a normal edge node belonging to the same stripe as the failed edge node. The core node 101C may use an App/VM 220 held in the core node 101C to execute processing of PVOL data, for example, streaming analysis processing, as though the failed edge node is alive. Operation executed in the event of a failure is described later.

The App/VM 203 of each edge node transmits real data in the PVOL 202 of the edge node to the core node 101C, and the core node 101C may obtain from the real data a snapshot (the SVOL 201A or 201B) for obtaining XOR update differential data. A load can be balanced when a snapshot is obtained by an edge node, whereas the load on the edge node can be reduced when a snapshot is obtained by the core node.

After executing the stream analysis processing or the like with the use of the App/VM 219, the core node 101C updates the erasure codes and discards data of the BVOLs. Analysis and backup capacity reduction in a storage system can be both achieved in this manner.

A stripe includes data elements from different edge nodes. This enables the storage system to restore data of a failed node from erasure codes and from data of a normal edge node. Data elements in a stripe may be pieces of data each from a different edge node, or a stripe may include data elements from the same edge node. How many data elements from the same edge node can be included in a stripe is determined by how many pieces of data in the edge node can be restored, in the event of a failure of the edge node, from data elements of another edge node and from erasure codes.

Figure 3A:
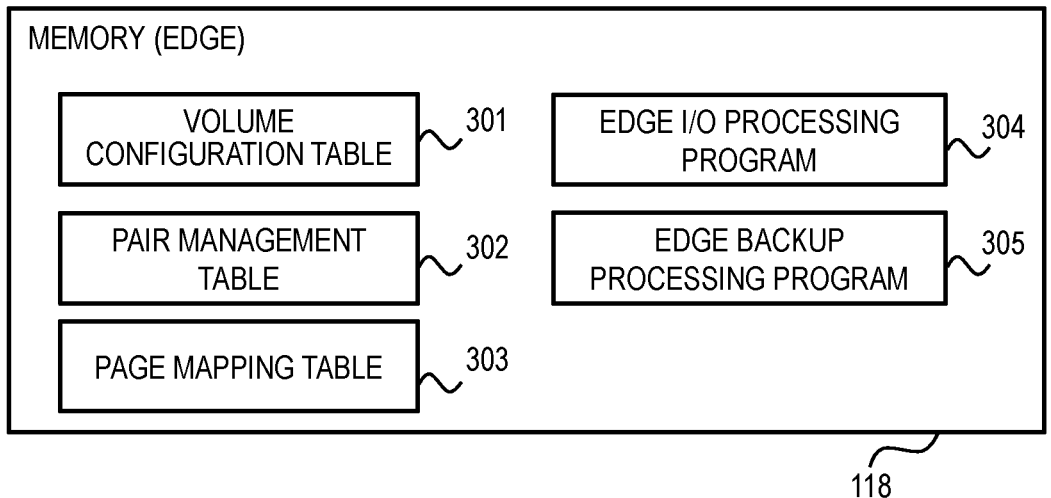
FIG. 3A is a diagram for illustrating an example of management information stored in the memories of the distributed storage system distributed among bases.
Figure 3B:
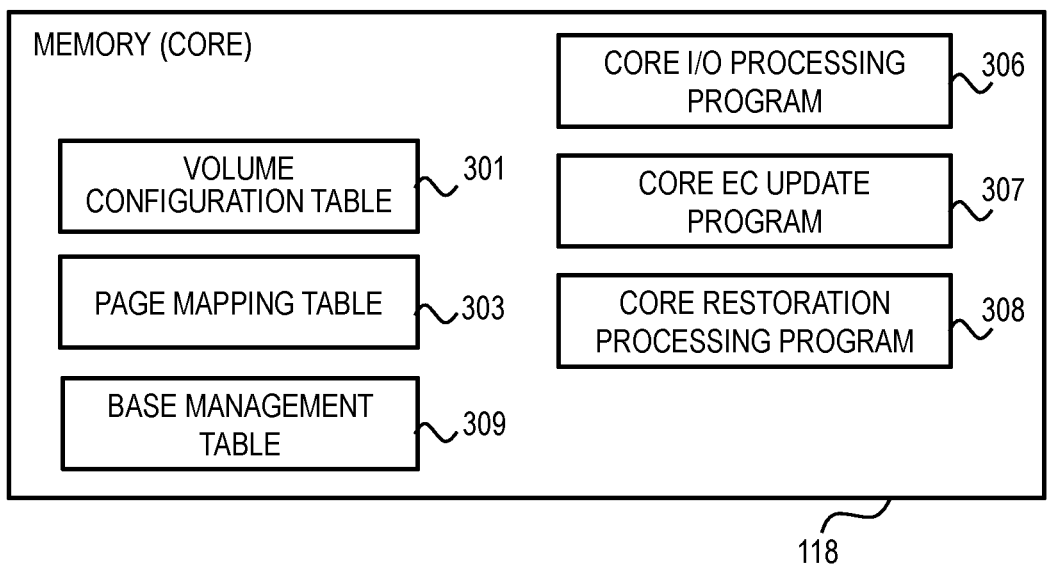
FIG. 3B is a diagram for illustrating the example of management information stored in the memories of the distributed storage system distributed among bases.

FIG. 3A and FIG. 3B are diagrams for illustrating an example of management information stored in the memories of the distributed storage system distributed among bases. The programs and tables are stored in the memories 118. The programs and tables may be stored in the drives 113, or a storage area that can be referred to by the processor 119 of another node. Programs stored in the memory 118 of each edge-side computer node are read by the processor 119 of the edge-side computer node, and programs stored in the memory 118 of the core-side computer node are read by the processor 119 of the core-side computer node, which allows the processor 119 to execute flows illustrated in FIG. 5 and subsequent drawings.

As illustrated in FIG. 3A, the memory 118 of each edge node stores a volume configuration table 301, a pair management table 302, and a page mapping table 303. The memory 118 of the edge node further stores an edge I/O processing program 304 and an edge backup processing program 305.

As illustrated in FIG. 3B, the memory 118 of the core node stores the volume configuration table 301, the page mapping table 303, and the base management table 309. The memory 118 of the core node further stores a core I/O processing program 306, a core EC update program 307, and a core restoration processing program 308.

The volume configuration table 301 indicates information about the configuration of each volume (the type, state, and the like of the volume). The pair management table 302 indicates the state of a pair. The page mapping table 303 is used to manage the association relation between a storage area in a virtual volume and an associated physical storage area. The base management table 309 is used in the core node to manage the configuration of each base (edge node).

The edge I/O processing program 304 executes I/O processing for the PVOL of the edge node. The edge backup processing program 305 executes backup processing with the use of the two SVOLs held in the edge node and the UVOL for transferring XOR update differential data to the core system.

The core I/O processing program 306 handles access to the BVOL that is mapped onto the UVOL of the edge node. The BVOL is the entity of the UVOL as described above. The core EC update program 307 updates an erasure code in the core node. The core restoration processing program 308 executes restoration processing in the core node when one of the edge nodes is inaccessible from the core node due to a failure in the edge node, a network failure, or the like.

A specific example of the configurations of tables indicating information that is held in the distributed storage system distributed among bases is described below. Only some entries are shown in each illustrated table. A blank cell in each illustrated table is a cell in which the illustration of data is omitted. The computer nodes each hold information of necessary entries, and an update in one computer node is notified to other relevant computer nodes.

FIG. 4A is a table for showing an example of the volume configuration table 301, which is used to manage the configuration of a volume. The volume configuration table 301 includes a VOL # column 311, a VOL type column 312, a state column 313, a pair VOL #314, a pair # column 315, and a port column 316.

The VOL # column 311 indicates an identifier by which a volume in the system is uniquely identified. The VOL type column 312 indicates the type of each volume. Examples of the type of a volume include PVOL, SVOL, UVOL, BVOL, CVOL, and RVOL. The state column 313 indicates the state of a volume. For instance, the state column 313 indicates whether an SVOL is in the "current" state or the "old" state, and indicates whether a BVOL is in an all-writes-complete state.

The pair VOL # column 314 indicates the identifier (VOL #) of an SVOL that forms a snapshot pair with the PVOL. The pair # column 315 indicates the identifier (pair #) of a snapshot pair of the PVOL. The pair # is used as reference for the pair management table 302. The port column 316 indicates the identifier of an access port of a volume.

FIG. 4B is a diagram for illustrating an example of the pair management table 302, which is used to manage the state of a pair. The pair management table 302 includes a pair # column 321, a pair state column 322, and an evacuation completion bitmap 323. The pair # column 321 indicates the identifier of a snapshot pair as the pair # column 315 does.

The pair state column 322 indicates the state of a snapshot pair. A "paired" state and a "split" state are included as a plurality of snapshot pair states defined in this disclosure.

The "paired" state is a state immediately after a snapshot pair is formed, and data is synchronized between the PVOL and the SVOL in the "paired" state. In other words, even when the PVOL is updated, the snapshot data (pre-update data) is not copied from the PVOL to the SVOL. Data read out of the PVOL is the same as data read out of the SVOL. Read access to the SVOL is the reading of data out of the PVOL through the SVOL.

The "split" state is a state changed from the "paired" state by a stilling instruction (splitting instruction) from an application of the edge node or from a user. Data in the SVOL is an image (snapshot data) stilled at the time the instruction is given, whereas data in the PVOL is the updated latest data. When an address area in the PVOL is updated for the first time after the instruction, pre-update data in this address area is copied to the SVOL before the update is conducted.

The splitting instruction may be issued at any timing. For example, an application may issue the splitting instruction at the time data consistency of the application is established, or an edge node may issue a splitting instruction at a suitable timing (e.g., once an hour).

The evacuation completion bitmap column 323 indicates a bitmap of already evacuated data in a snapshot pair. The evacuation completion bitmap indicates, for each address area of a given size in the PVOL, whether data in the address area is already evacuated. Each bit in the evacuation completion bitmap indicates whether snapshot data in its corresponding address area of a given size (for example, several hundred KB) is already evacuated (copied) from the PVOL to the SVOL.

FIG. 4C is a table for showing an example of the page mapping table 303, which is used to manage information about page mapping of a pool (a pool of SVOLs or a pool of BVOLs). The page mapping table 303 indicates a pair (association relation) of a virtual storage space provided to the outside, for example, a PVOL or an SVOL, and a real storage space associated with the virtual storage space. A virtual storage space is identified by a pair of a virtual VOL # and an LBA #. A real storage space is identified by a pair of a logical VOL # and an LBA #. In the case of a pair in which no logical storage space is allocated to the virtual storage space yet, the pair's cell in the table holds "-", which indicates the absence of a logical-side value.

FIG. 4D is a diagram for illustrating an example of the base management table 309. The base management table 309 includes a base number column 391, a base state column 392, and a reference-to-volume-configuration-information column 393. The base number column 391 indicates a base number, which is the identifier of a base in the system.

The base state column 392 indicates the state of a base. For example, "normal" indicates that the base is in a normal state. "Disconnected" indicates a state in which the base is inaccessible due to a network failure or other factors. "Failure" indicates a state in which the base has lost data due to a disaster or other factors. Whether to execute data restoration, which is described later, is determined based on the base state.

The reference-to-volume-configuration-information column 393 indicates reference to the volume configuration table with respect to a base. The reference-to-volume-configuration-information column 393 further indicates the size of a target volume, the number of volumes, and the like.

Figure 5:
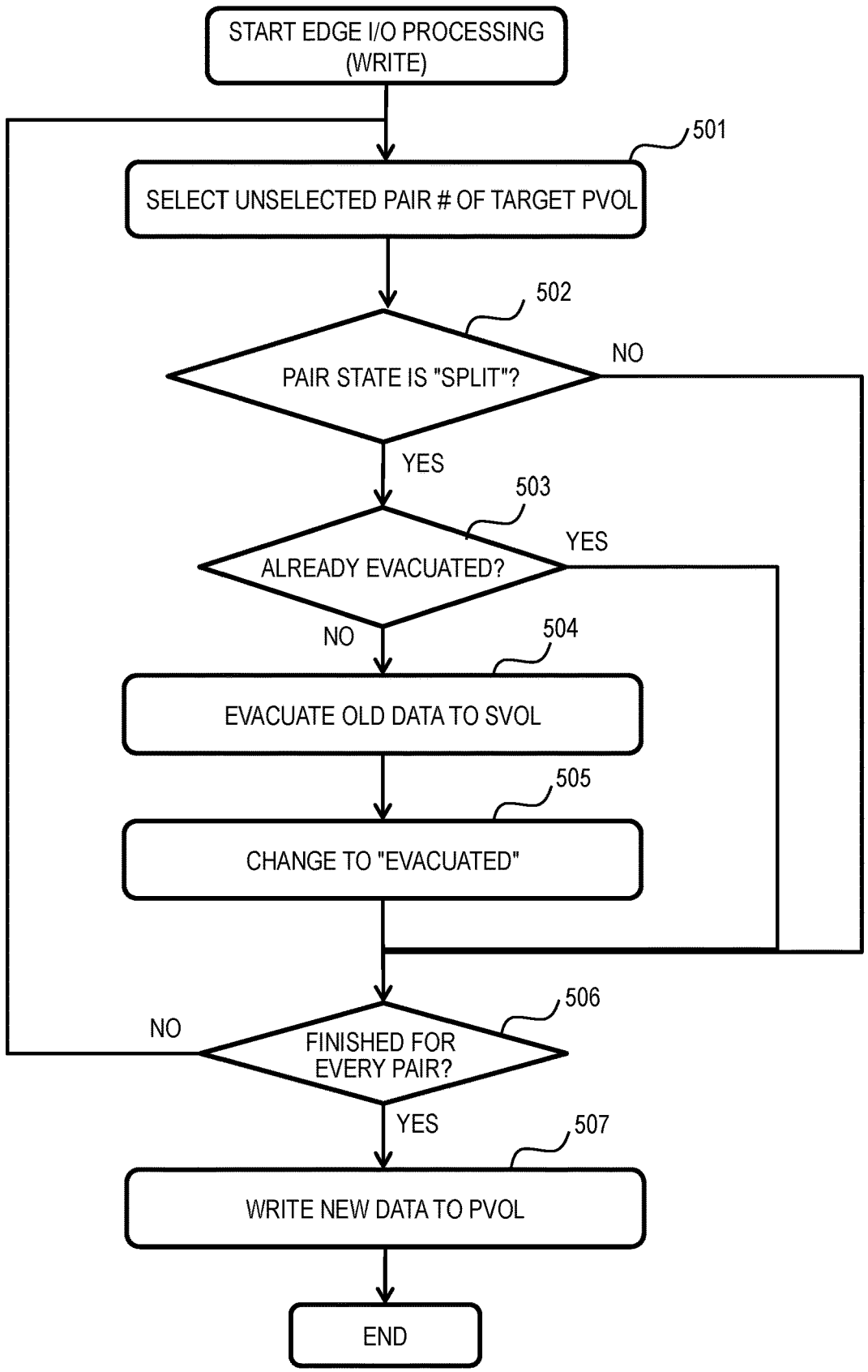
FIG. 5 is an example of a flow chart of the edge I/O processing (write).

FIG. 5 is an example of a flow chart of the edge I/O processing (write). This processing is write processing executed by the edge system (edge nodes) to write to a PVOL. This processing involves evacuating old data (pre-update data) in update write of the PVOL to the SVOL of a snapshot pair in the "split state", out of the two types of SVOLs described above with reference to FIG. 2.

When a write request to write to the PVOL is received, the edge I/O processing program 304 selects an unselected pair # of the target PVOL from the pair # column 315 of the volume configuration table 301 (Step 501). The unselected pair is one of two snapshot pairs in the example of FIG. 2. The edge I/O processing program 304 next refers to the pair state column 322 of the pair management table 302 to determine whether the pair state for the selected pair # is the "split" state (Step 502).

When the pair state is not the "split" state (when the pair state is the "paired" state) (Step 502: NO), the edge I/O processing program 304 determines whether the execution of Step 501 to Step 505 is finished for every snapshot pair of the PVOL (Step 506). When no snapshot pair remains for which the execution of Step 501 to Step 505 is unfinished (Step 506: NO), the edge I/O processing program 304 writes new data to the PVOL (Step 507), and ends this processing.

When the pair state is the "split" state (Step 502: YES), the edge I/O processing program 304 refers to the pair management table 302 to obtain an evacuation completion bitmap of the pair from the evacuation completion bitmap column 323. The edge I/O processing program 304 checks the obtained evacuation completion bitmap to find out whether data in an updated area is already evacuated (Step 503).

When the data is already evacuated (Step 503: YES), the edge I/O processing program 304 proceeds to Step 506. When the data is not evacuated yet (Step 503: NO), the edge I/O processing program 304 evacuates the old data to the SVOL (Step 504). Specifically, the edge I/O processing program 304 allocates an area in a pool to the SVOL (updates the page mapping table 303), and copies the PVOL's old data, which is not updated yet, to the allocated area of the SVOL.

The edge I/O processing program 304 then marks the old data as already evacuated data on the evacuation completion bitmap of the snapshot pair in the pair management table 302 (Step 505). Specifically, the edge I/O processing program 304 changes the value of the corresponding bit from 0 to 1 in the evacuation completion bitmap read in Step 503, and writes the changed value in the evacuation completion bitmap column 323. The edge I/O processing program 304 then proceeds to step 506.

Through this processing, snapshot data can be evacuated to an SVOL and an address area in which a differential has been caused can be managed in the pair management table 302.

Figure 6:
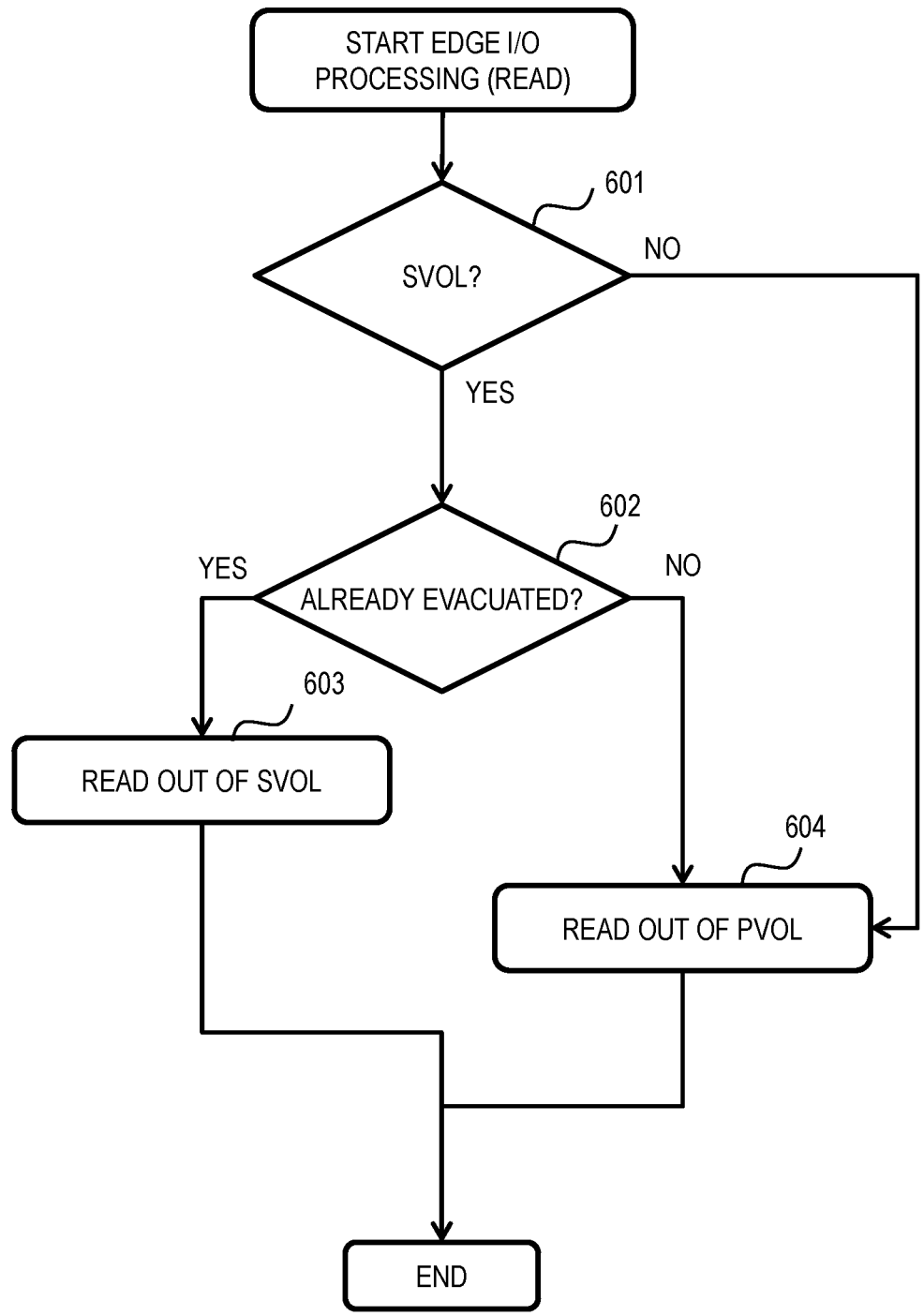
FIG. 6 is an example of a flow chart of the edge I/O processing (read).

FIG. 6 is an example of a flow chart of the edge I/O processing (read). This processing is read processing executed by the edge system (edge nodes) to read a PVOL or an SVOL. The snapshot pair configuration of FIG. 2 is referred to in the following description.

The edge I/O processing program 304 receives a read command in which the VOL # and address (LBA) of an access destination are included. The edge I/O processing program 304 refers to the volume configuration table 301 to determine whether the access destination in the read command is the PVOL 202 or one of the SVOLs (the SVOL 201A or the SVOL 201B) (Step 601).

When the access destination is one of the SVOLs (Step 601: YES), the edge I/O processing program 304 determines whether data at the access destination address in the access destination SVOL is already evacuated to one of the SVOLs (the pool 208) (Step 602).

Specifically, the edge I/O processing program 304 refers to the volume configuration table 301 to obtain from the pair # column 315 the pair # of a snapshot pair in which the access destination SVOL is included. The edge I/O processing program 304 refers to the pair management table 302 to obtain an evacuation completion bitmap for the obtained pair # from the evacuation completion bitmap column 323.

The edge I/O processing program 304 determines from the obtained evacuation completion bitmap whether the data at the access destination address is already evacuated to one of the SVOLs (the pool 208). A data update made to the PVOL 202 means that pre-update data is evacuated to one of the SVOLs (the pool 208).

When the data at the access destination address is already evacuated (Step 602: YES), the edge I/O processing program 304 reads the access destination data out of the SVOL (Step 603). Specifically, the edge I/O processing program 304 obtains the access destination data from the pool 208 to which the SVOL belongs.

When the data at the access destination address is not evacuated (Step 602: NO), it means that data at the access destination address in the PVOL 202 is not updated, and the edge I/O processing program 304 accordingly reads the access destination data out of the PVOL 202 (Step 604). The edge I/O processing program 304 reads the access destination data out of the PVOL 202 (Step 604) also when the access destination is the PVOL 202 (Step 601: NO).

Through the processing described above, the host can obtain an old stilled image (snapshot) at a particular time point (a splitting time point) by referring to an SVOL, and can obtain the latest data by referring to a PVOL.

Figure 7:
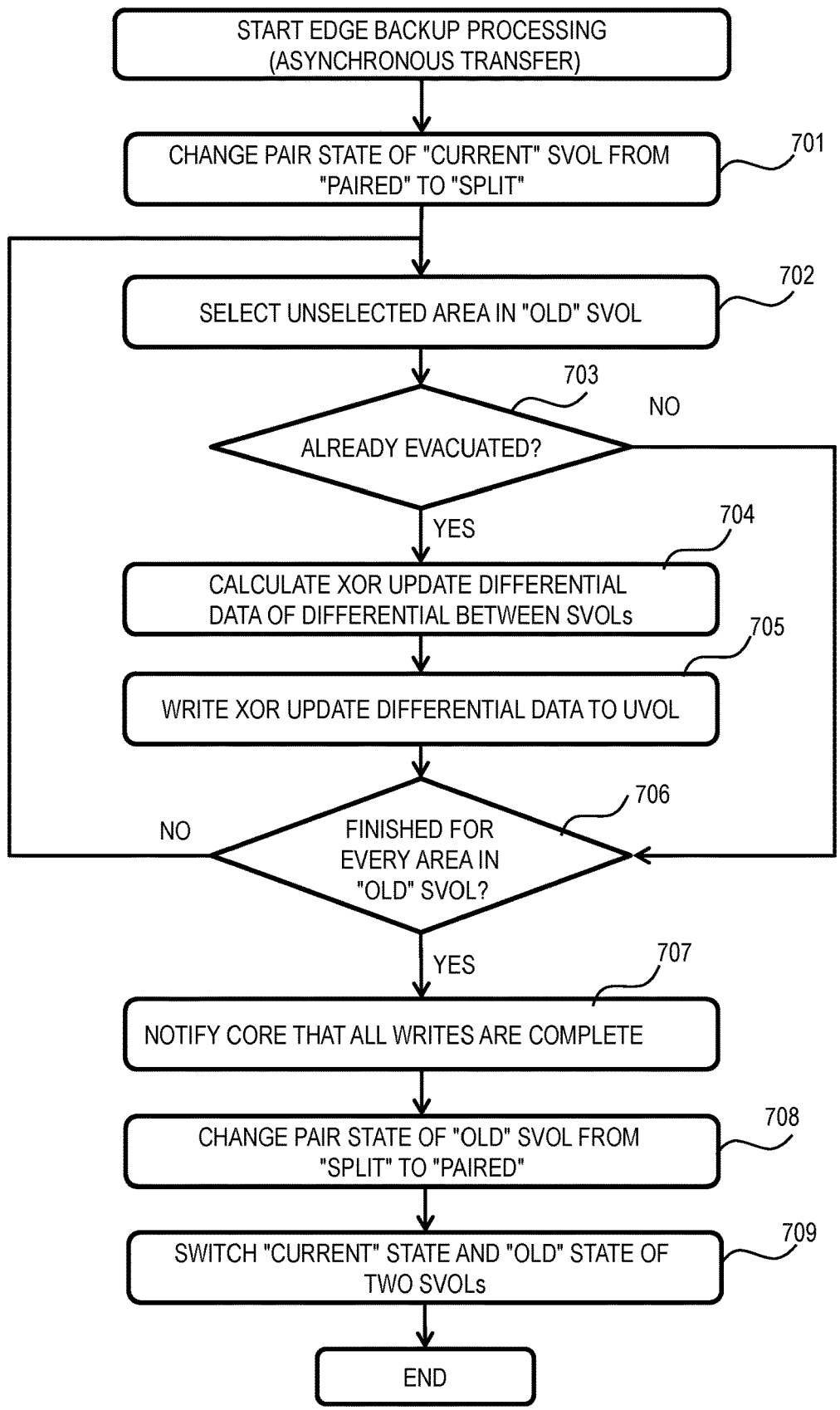
FIG. 7 is an example of a flow chart of the edge backup processing (asynchronous transfer).

FIG. 7 is an example of a flow chart of the edge backup processing (asynchronous transfer). This processing includes obtaining XOR update differential data that represents a differential between SVOLs and transferring the XOR update differential data to the core system, which are executed by the edge system (edge nodes). This processing is executed asynchronously with data update of the PVOL, to thereby avoid a delay in response to the host. A trigger for starting this processing is not particularly limited. For example, this processing is executed each time a given period elapses (periodical execution) or each time the amount of update data of the PVOL reaches a prescribed value, under instruction from an application or from the user.

A reference is made to the snapshot pair configuration of FIG. 2 in the following description. Before this processing is started, the snapshot pair 204A of the "old" SVOL 201A is in the "split" state, and the snapshot pair 204B of the "current" SVOL 201B is in the "paired" state. For example, data of the "old" SVOL 201A prior to the start of this processing is a snapshot at 9:00, and the time at which this processing is started is 10:00.

The edge backup processing program 305 changes the pair state of the "current" SVOL 201B from the "paired" state to the "split" state (Step 701). This makes the "current" SVOL 201B a volume of the current time snapshot. Data of the "current" SVOL 201B is, for example, a snapshot at 10:00.

The edge backup processing program 305 updates the value of this snapshot pair in the pair state column 322 of the pair management table 302. Specifically, the edge backup processing program 305 refers to the volume configuration table 301 to obtain the pair # of the "current" SVOL 201B from the pair # column 315, and update the cell for the obtained pair # in the pair state column 322.

The edge backup processing program 305 next selects an unselected area (address area) corresponding to one bit of an evacuation completion bitmap from the "old" SVOL 201A (Step 702). The unit of selection may be a partial area that is a part of the area corresponding to one bit.

The edge backup processing program 305 checks whether data in the selected area is already evacuated (Step 703). Specifically, the edge backup processing program 305 refers to the volume configuration table 301 to obtain the pair # of the "old" SVOL 201A from the pair # column 315.

The edge backup processing program 305 further refers to the pair management table 302 to obtain an evacuation completion bitmap for the obtained pair # from the evacuation completion bitmap column 323. The edge backup processing program 305 selects an unselected bit from the evacuation completion bitmap. The edge backup processing program 305 determines that data in an area corresponding to the selected bit is already evacuated when the selected bit is 1, and determines that the data in the corresponding area is not evacuated yet when the selected bit is 0.

When it is determined that the data in the selected area is already evacuated (Step 703: YES), the selected area is an area from which data has been evacuated to the "old" SVOL 201A, for example, an area in the PVOL 202 that has been updated between 9:00 and 10:00.

The edge backup processing program 305 calculates the exclusive-OR XOR of data of the selected address area (LBA area) in the "current" SVOL 201B and data of the same address area in the "old" SVOL 201A. XOR update differential data of the selected address area is obtained in this manner (Step 704). For example, XOR update differential data that is a differential between the snapshot at 10:00 and the snapshot at 9:00 is obtained.

Data of the "old" SVOL 201A to be selected is already evacuated data, and is accordingly obtained from the pool 208. Data in the "current" SVOL 201B that is the same as that of the PVOL 202 is obtained from the PVOL 202. Data already evacuated to the "current" SVOL 201B is obtained from the pool 208.

Next, the edge backup processing program 305 writes the generated XOR update differential data to the UVOL 206 (Step 705). The data written to the UVOL 206 is transferred to the core system (core node 101C) via the UVOL 206. The amount of data transferred and the processing load on the system are reduced by generating and transferring only XOR update differential data of already evacuated data. The data transfer may use, other than the simple write method described above, the technology described in U.S. Pat. No. 7,152,079 B2, or a method commonly used in remote copying.

The edge backup processing program 305 determines whether the execution of Step 702 to Step 705 is finished for every area in the "old" SVOL 201A that corresponds to the PVOL 202 (Step 706). When the execution of Step 702 to Step 705 is finished for every area in the "old" SVOL 201A (Step 706: YES), the edge backup processing program 305 notifies the core system (core node 101C) that all write operations are complete (Step 707).

The notification indicates that all pieces of XOR update differential data are now stored in a relevant BVOL of the core system, and enables the core system to execute subsequent EC update processing. This ensures that erasure codes can be generated in the core system with the use of consistent pieces of XOR update differential data, even when line disconnection in the middle of processing or a failure in the edge system occurs.

The edge backup processing program 305 next changes the snapshot pair 204A of the "old" SVOL 201A from the "split" state to the "paired" state (Step 708). The edge backup processing program 305 updates the value of this snapshot pair in the pair state column 322 of the pair management table 302. This resets differential data (evacuated data) of the "old" SVOL 201A to synchronize the "old" SVOL 201A with the PVOL 202.

The edge backup processing program 305 further switches the states of the two SVOLs (Step 709). Specifically, the edge backup processing program 305 changes the state of the SVOL 201A from "old" to "current", and changes the state of the SVOL 201B from "current" to "old". The edge backup processing program 305 updates the values of relevant cells in the state column 313 of the volume configuration table 301.

From then on, the pair state of the "current" SVOL 201A is kept to the "paired" state and the pair state of the "old" SVOL 201B is kept to the "split" state. For example, a snapshot at 10:00 is maintained in the "old" SVOL 201B. The edge backup processing (asynchronous transfer) can be re-executed any time.

In this example, the UVOL 206 is used to transfer data to the core system, and the ratio of an SVOL and a UVOL in terms of LBA space is 1:1, as well as the ratio of a UVOL and a BVOL in terms of LBA space. In other words, an address area of XOR update differential data in an SVOL matches with an address area in a BVOL via a UVOL.

Each edge node may transfer meta data including address information of real data of an XOR update differential to the core system along with the real data of the XOR update differential. When there are three or more SVOLs, for example, one "current" SVOL and a plurality of generations of "old" SVOLs in the "split" state exist. XOR update differential data representing a differential between the "current" SVOL and the latest one of the plurality of generations of "old" SVOLs in the "split" state is transferred in this case. After the transfer, the "current" SVOL is changed to the "old" state, and the "old" SVOL of the oldest generation is changed to the "paired" state and the "current" state.

Figure 8:
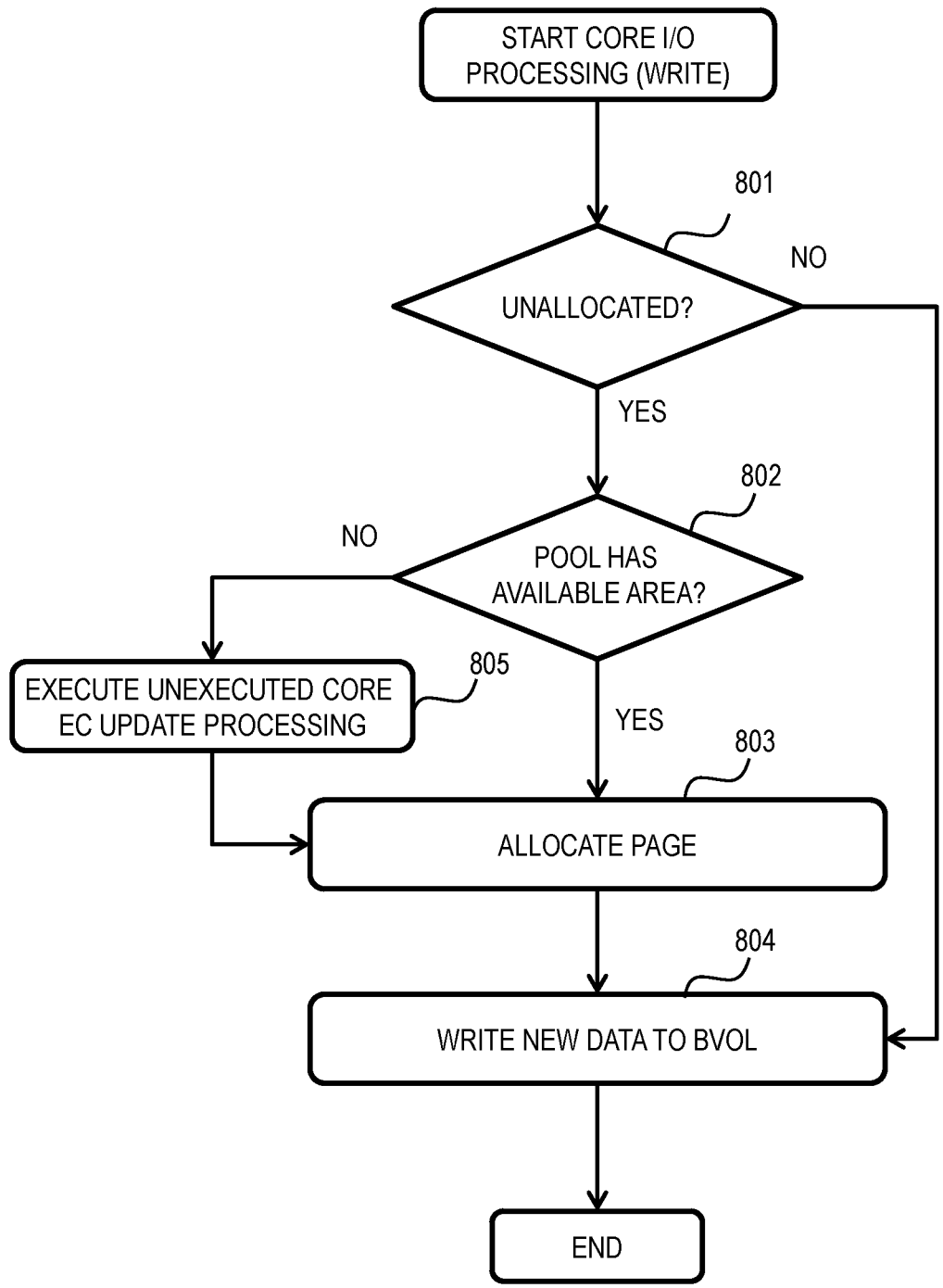
FIG. 8 is an example of a flow chart of core write processing.

FIG. 8 is an example of a flow chart of core write processing. This processing is executed by the core system to write data to a BVOL coupled as a UVOL to the edge system. The consumption of storage areas in the core system can be reduced by constructing the BVOL from a virtual volume. The BVOL in the following description is a virtual volume. In the following, a description is given with reference to the configuration of FIG. 2.

The core I/O processing program 306 refers to the page mapping table 303 to determine whether a physical storage area (physical page) is unallocated to an access destination address area (a virtual volume page) in the BVOL (Step 801).

When a physical page is unallocated (Step 801: YES), the core I/O processing program 306 checks whether the pool 211 has an available area to store new data, namely, a physical page that can be allocated (Step 802). When there is a physical page that can be allocated (Step 802: YES), the core I/O processing program 306 allocates the physical page by updating the page mapping table 303 (Step 803). The core I/O processing program 306 then writes new data received from the edge system to the access destination area in the BVOL (Step 804).

When available areas in the pool 211 are depleted and the pool 211 has no area available for the storage of new data (Step 802: NO), the core EC update program 307 executes unexecuted core EC update processing in response to a request from the core I/O processing program 306, thereby generating available areas in the pool 211 (Step 805). The core I/O processing program 306 instructs the edge system to suspend the transfer of XOR update differential data until new available areas are generated.

Figure 9:
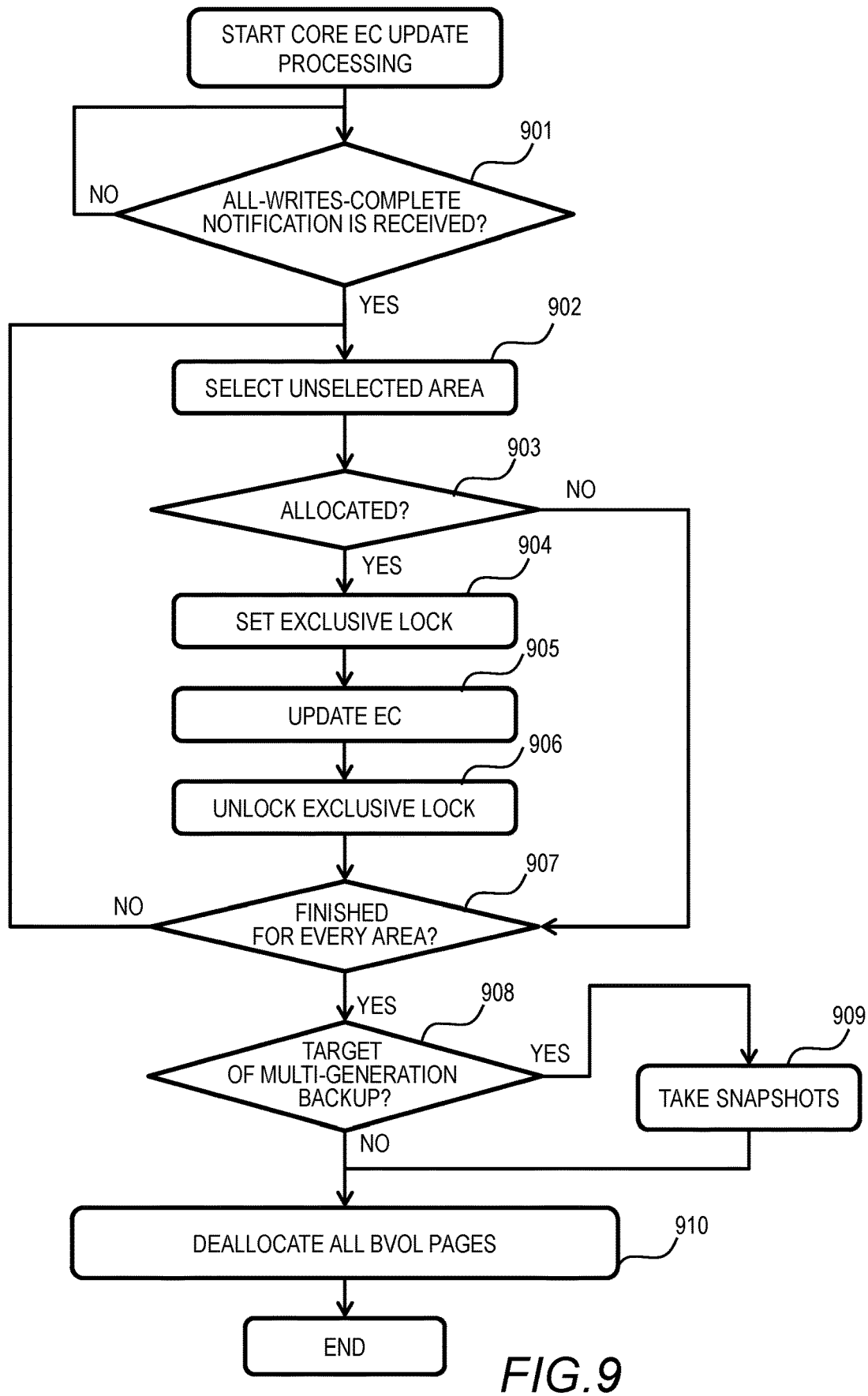
FIG. 9 is an example of a flow chart of the core EC update processing.

FIG. 9 is an example of a flow chart of the core EC update processing. This processing is executed by the core system to update erasure codes, after the edge backup processing described with reference to FIG. 7 is completed. In other words, the core system updates erasure codes in a stripe in which data of a BVOL that has received the all-writes-complete notification is included.

In the following description, when edge backup processing is completed for a plurality of BVOLs in one stripe, and the all-writes-complete notification is already received, erasure codes are updated with the use of XOR update differential data of the plurality of BVOLs.

Write from the edge nodes to the BVOLs in the strip may be synchronized (snapshots of generations have a common time stamp) or may not be synchronized. The core system may hold off updating erasure codes until a prescribed number of BVOLs in the stripe receive the all-writes-complete notification. The core system may execute the core EC update processing separately for each BVOL finished with the edge backup processing. In other words, erasure codes may be updated by using only XOR update differential data of one data element in the stripe while setting other data elements as zero data.

Referring to FIG. 9, the core EC update program 307 receives the all-writes-complete notification (Step 901: YES), and then executes subsequent steps for each area in BVOLs that have received the all-writes-complete notification. The core node 101C holds management information (not shown) used to manage relationships among elements from PVOLs, SVOLs, BVOLs, and CVOLs that are included in the same stripe.

A premise of the following description is that the all-writes-complete notification is received with respect to a plurality of BVOLs belonging to one stripe. In the example of FIG. 2, the all-writes-complete notification is received with respect to the BVOL (B2) 208B and the BVOL (B4) 208D out of the BVOLs 208A to 208D belonging to the stripe.

The core EC update program 307 selects an unselected address area in the address spaces of the BVOLs (Step 902). The core EC update program 307 refers to the page mapping table 303 to determine, for each target BVOL, whether a physical storage area is already allocated to the selected address area (Step 903).

Areas allocated to BVOLs are deallocated after the core EC update processing as described later as shown in Step 910, which means that only an address area to which a physical storage area is allocated stores XOR update differential data transferred from the edge system. The address area in which XOR update differential data is stored varies from one BVOL to another.

When a physical storage area is already allocated to the selected address area in one of the BVOLs (Step 903: YES), the core EC update program 307 sets exclusive lock on address areas in which erasure codes of the stripe are stored for each of the CVOLs storing those erasure codes (Step 904). This prohibits write to the address areas to maintain consistency of the erasure codes. The exclusive access control is executed within the core system and is independent of the edge system, which makes the exclusive access control independent of the network and accordingly high speed.

The core EC update program 307 next updates the erasure codes (Step 905). Specifically, the core EC update program 307 reads XOR update differential data out of each BVOL in which a physical storage area is already allocated to the selected address area. Data elements of other BVOs are zero data.

The core EC update program 307 further reads erasure codes associated with the selected address area out of the respective CVOLs. The core EC update program 307 updates the read erasure codes with the use of the read XOR update differential data, and writes the updated erasure codes back to the respective CVOLs.

Through update of the erasure codes with the XOR update differential data, the snapshot data of relevant volumes in the erasure codes is changed from snapshot data of a previous generation to snapshot data of the current generation.

The core EC update program 307 next unlocks the exclusive lock set on the CVOLs (Step 906). The core EC update program 307 determines whether the execution of Step 902 to Step 906 is finished for every address area in the address spaces of the BVOLs (Step 907). When it is determined that the execution of Step 902 to Step 906 is finished for every address area (Step 907: YES), the core EC update program 307 determines, for each target BVOL (for each corresponding PVOL on the edge side), whether the BVOL is a target of multi-generation backup (Step 908).

When the BVOL is a target of multi-generation backup (Step 908: YES), the core EC update program 307 generates a snapshot (stilled image) of this BVOL (Step 909). Sequentially received pieces of XOR update differential data of multiple generations are stored in this manner. Information about whether the BVOL is a target of multi-generation backup may be held in, for example, the volume configuration table 301.

Snapshots that make up a multi-generation backup are an aggregation of XOR update differential data elements in address areas different from one another, and are used for restoration in which the time point of restoration is specified. (The XOR update differential data of) the snapshots for multi-generation backup are not used in normal operation, and may accordingly be compressed and backed up on a tape or other archive media. When the BVOL is not a target of multi-generation backup (Step 908: NO), Step 909 is skipped.

The core EC update program 307 next deallocates all pages of each BVOL, namely, all physical storage areas allocated to the BVOL (Step 910). The core EC update program 307 initializes data of the BVOL in the page mapping table 303 (returns the BVOL to the unallocated state), thereby deallocating all pages of the BVOL.

Figure 10:
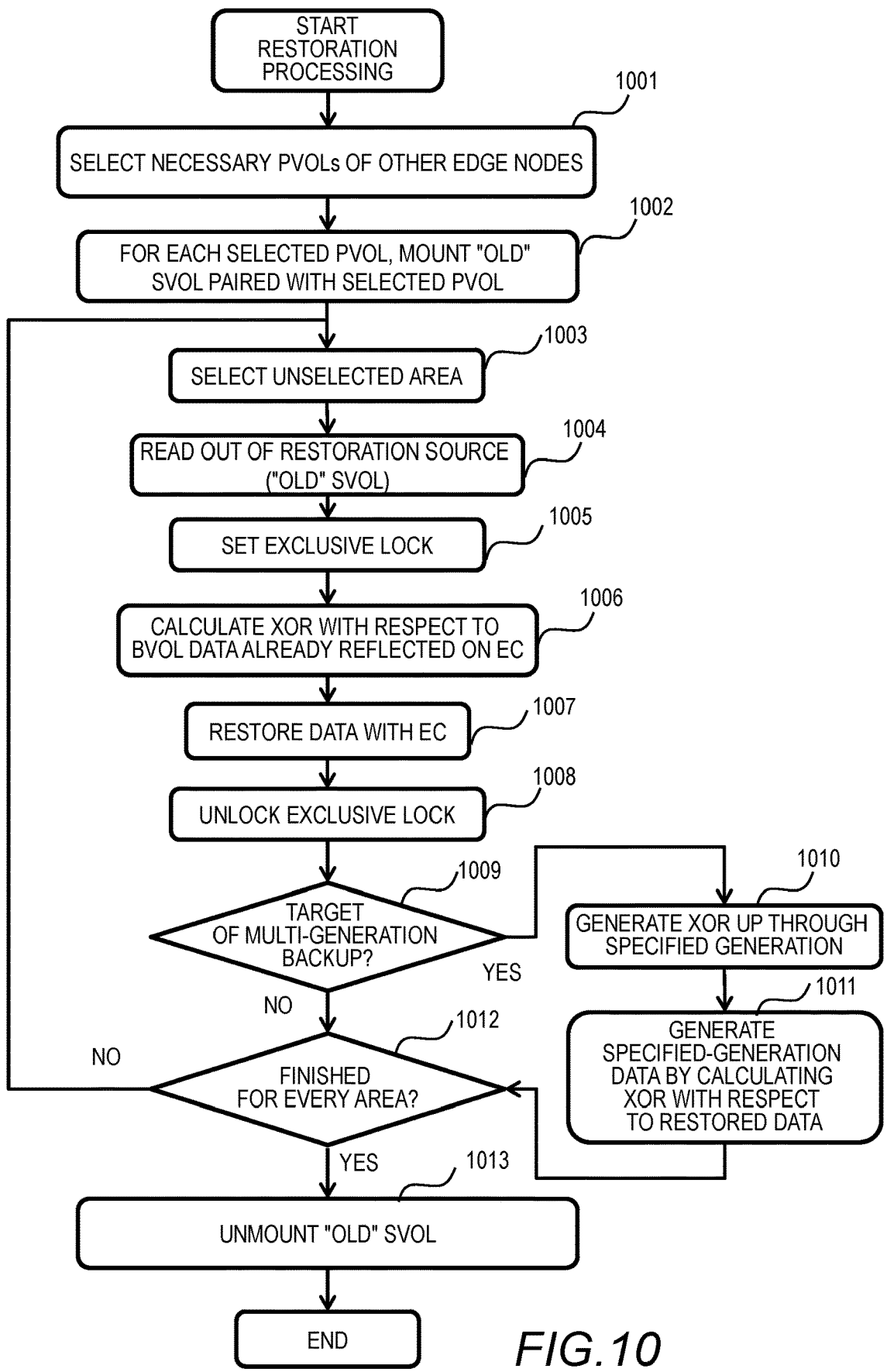
FIG. 10 is an example of a flow chart of the restoration processing.

FIG. 10 is an example of a flow chart of the restoration processing. This processing is executed by the core system when, for example, one of the edge nodes or a volume in the edge node becomes inaccessible from the core system due to a failure in the edge node or a failure in the network. The occurrence of a failure is indicated by the base management table 309.

In the following description, one PVOL in an edge node that has become inaccessible is restored. Specifically, the restoration of the PVOL is the restoration of data in an SVOL that forms a snapshot pair with the PVOL, namely, a snapshot of the PVOL at a particular time point.

The core restoration processing program 308 selects, from a stripe to which the PVOL of the inaccessible edge node belongs, PVOLs of other edge nodes (Step 1001). The number of PVOLs (edge nodes) to be selected is calculated by subtracting the number of erasure codes from the number of data elements included in the stripe.

For each of the selected PVOLs, the core restoration processing program 308 mounts an "old" SVOL that forms a snapshot pair with the selected PVOL (Step 1002). For example, the core restoration processing program 308 uses a UVOL or other mapping technologies to mount the "old" SVOL, thereby enabling the core side to refer to the "old" SVOL of the edge node. Data of the mounted "old" SVOL is restoration source data for data restoration.

The core restoration processing program 308 selects an unselected address area in the address space of the restoration target "old" SVOL (PVOL) (Step 1003). From each mounted "old" SVOL, which is a restoration source, the core restoration processing program 308 reads data (a data element) of the selected address area (Step 1004).

The core restoration processing program 308 sets exclusive lock on areas of the CVOLs in which erasure codes of the stripe are stored (Step 1005). When a data element of a BVOL is already reflected on an erasure code, the core restoration processing program 308 calculates the exclusive-OR of the data element of the BVOL and a corresponding data element of the "old" SVOL (Step 1006).

When a data element of a BVOL is already reflected on an erasure code, it means that an associated erasure code of the PVOL is being updated, and that the erasure code is already updated with XOR update differential data of the "current" SVOL and the "old" SVOL in the selected address area.

The core restoration processing program 308 accordingly generates a data element of the "current" SVOL by calculating the exclusive-OR of the data element of the BVOL and the data element of the "old" SVOL. The data element of the "current" SVOL generated by the calculation is a restoration source data element for restoring the restoration target SVOL. Each restoration source data element is thus a data element of the "old" SVOL or a data element of the "current" SVOL.

The core restoration processing program 308 restores data from an erasure code and a restoration source data element (Step 1007). Specifically, the core restoration processing program 308 reads an associated erasure code out of a relevant CVOL. The core restoration processing program 308 restores data from the read erasure code and a restoration source data element with the use of a given algorithm, for example, the Reed-Solomon code. The core restoration processing program 308 then unlocks the exclusive lock on the CVOL (Step 1008).

The core restoration processing program 308 refers to the management information (not shown) to determine whether the restoration target SVOL is a target of multi-generation backup (Step 1009). The management information may be included in the volume configuration table 301.

When the restoration target SVOL is a target of multi-generation backup (Step 1009: YES), snapshots of XOR update differential data for multi-generation backup are read to generate pieces of XOR update differential data up to a generation specified in advance or specified by the user (Step 1010).

The core restoration processing program 308 sequentially calculates the exclusive-OR of the restored data and the XOR update differential data generated up to the specified generation, to generate data of the specified generation (Step 1011). Data of a plurality of generations can be restored in this manner. When the restoration target SVOL is not a target of multi-generation backup (Step 1009: NO), Step 1010 and Step 1011 are skipped.

The core restoration processing program 308 determines whether the execution of restoration is finished for every address area in the restoration target volume (Step 1012). When the outcome of the determination is "NO", the core restoration processing program 308 returns to Step 1003. When the outcome of the determination is "YES", the core restoration processing program 308 unmounts the mounted "old" SVOL of the edge node (Step 1013), and ends the restoration processing. Through the restoration processing, a volume in an edge node can be restored properly in the core system.

According to the data protection and placement technology of the first embodiment, the storage capacity required by a backup-side data center (a core data center) can be reduced significantly, and the storage cost necessary to build a system is accordingly reduced. Efficient data access may be accomplished by combining the processing described above with pre-fetch.

Second Embodiment

Figure 11:
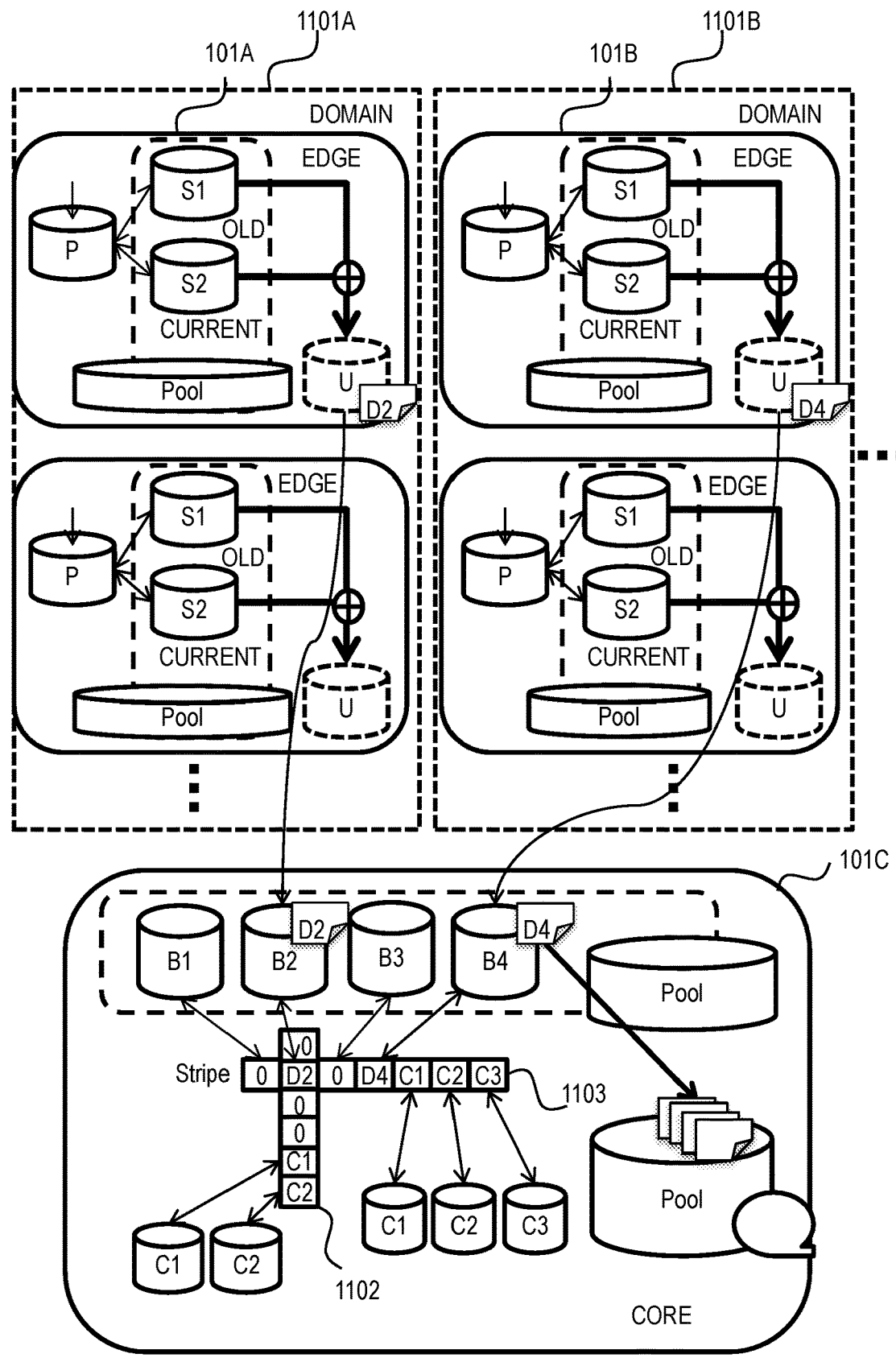
FIG. 11 is a diagram for illustrating an example of the logical configuration of a computer system according to a second embodiment of this invention.

FIG. 11 is a diagram for illustrating an example of the logical configuration of a computer system according to a second embodiment of this invention. This computer system has domains in an edge system. Of the plurality of domains in the edge system, two domains, 1101A and 1101B, are illustrated in FIG. 11. A computer node in one domain is, for example, a computer node in one local network.

The second embodiment includes a plurality of protection layers. Specifically, the core node 101C generates, for each protection layer, two types of stripes associated with the protection layer. A first protection layer stripe is made up of data elements of a computer node in one domain and erasure codes of the data elements. A second protection layer stripe is made up of data elements of computer nodes in different domains and erasure codes of the data elements. The data elements are included in the two protection layer stripes. More than two layers may be set.

In FIG. 11, a stripe 1102 is the first protection layer stripe made up of data elements of the same domain and erasure codes of the data elements. A stripe 1103 is the second protection layer stripe made up of data elements of different domains and erasure codes of the data elements. The data element D2 is included in both the stripe 1102 and the stripe 1103. Erasure codes in the two types of stripes are stored in different CVOLs.

With the intra-domain stripe 1102 and the inter-domain stripe 1103 set up in the manner described above, one piece of data can be protected by two or more measures, which improves the availability of the system. In addition, a failed edge node in a domain can be restored from erasure codes within the domain, which leads to a reduction in the amount of transfer over a network between domains, and efficient data restoration. The band efficiency of the core system may be improved by executing restoration on a processing device in a local network and transmitting the result to the core system.

Third Embodiment

Figure 12:
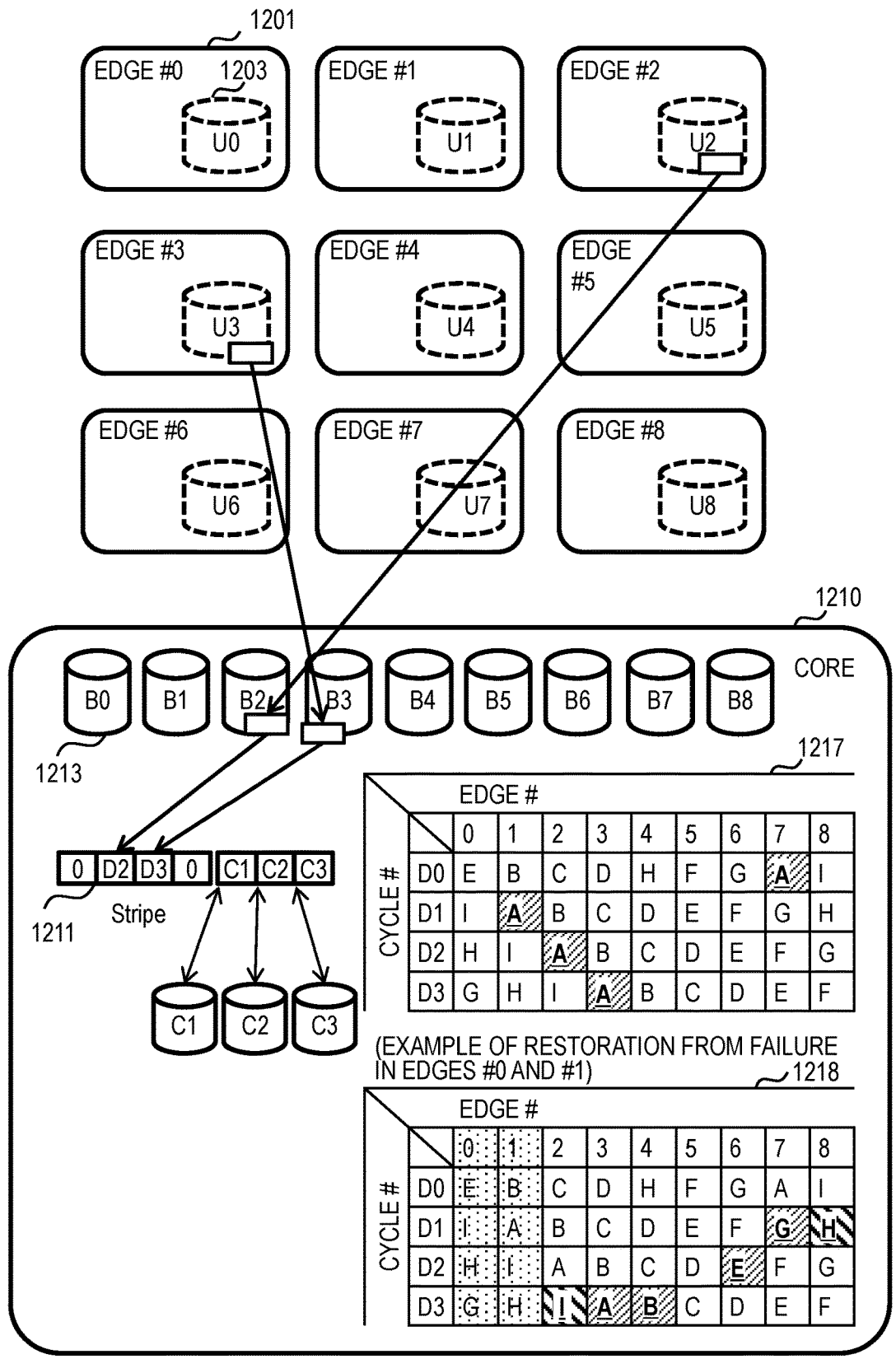
FIG. 12 is a diagram for illustrating an example of the logical configuration in a computer system according to a third embodiment of this invention.

FIG. 12 is a diagram for illustrating an example of the logical configuration in a computer system according to a third embodiment of this invention. The restoration processing described with reference to FIG. 10 can be combined with a distributed RAID technology to accomplish more efficient restoration processing. A stripe in a distributed RAID is distributed among a larger number of computer nodes than the number of elements that make up the stripe (the total number of data elements and erasure codes). In FIG. 12, only some of elements of the same type are denoted by a reference symbol.

Nine edge nodes 1201 and one core node 1210 are included in the example of FIG. 12. The edge nodes 1201 each hold a UVOL 1203. As described in the first embodiment, each edge node 1201 holds a PVOL (not shown) and two SVOLs (not shown), the three of which correspond to the UVOL 1203. A core node 1210 holds BVOLs 1213, which are each mapped onto one of the UVOLs 1203.

The core node 1210 holds erasure codes as described in the first embodiment, as backup data of the nine edge nodes 1201. A stripe 1211 in the example of FIG. 12 is made up of four data elements and three erasure codes. The core node 1210 uses data received from four edge nodes 1201 out of the nine edge nodes 1201 to generate erasure codes for one stripe.

The third embodiment uses the distributed RAID technology to define a plurality of combinations of edge nodes that make up a stripe. The combinations are called stripe types in the following description. A stripe type is determined by the combination of a cycle # and the edge # of an edge node. The cycle # is the remainder of the address (LBA) of a BVOL divided by a prescribed cycle count. Address areas are accordingly configured from repetitive cyclic areas, and consecutive cycles # are assigned to consecutive areas (addresses) among the cyclic areas.

A stripe type mapping table 1217 defines stripe types, with the cycle # and the edge # as indices. In other words, the stripe type mapping table 1217 indicates the association relation between a combination of the cycle # and the edge #, and a stripe type.

Nine stripe types, A to I, are defined in the example of FIG. 12. Each stripe type is associated with a plurality of combinations of a cycle # and an edge #, four combinations in the example of FIG. 12. All associated combinations of a cycle # and an edge # differ from one another. Each combination of a cycle # and an edge # represents a different stripe type. The stripe types are not limited to this example, and can be determined by following any predetermined rule.

For example, the core node 1210 reads data out of a BVOL completed with all write operations for each cyclic area, and determines the address type of each data element by following the stripe type mapping table 1217. The core node 1210 includes data elements of the same address type in the same stripe, and then updates erasure codes.

An example is given in which all write operations are complete for the BVOL B2 and the BVOL B3 in FIG. 12. The core node 1210 updates erasure codes with the use of a data element of the stripe type A in the BVOL B2 and a data element of the stripe type A in the BVOL B3.

In the manner described above, data of one edge node is classified into a plurality of stripe types, and each stripe type includes data of a combination of different edge nodes. With data for restoration distributed among a larger number of storage nodes, the amount of data reference for restoration per edge node can be reduced. This reduces the load on the edge node, or accomplishes fast restoration through distributed processing. The data reference amount per edge node in the example of FIG. 12 is ¼ of the data reference amount in a normal RAID.

When the level of redundancy is 2 or higher (the number of erasure codes is 2 or more), reliability can be improved by restoring high priority data before other pieces of data. A stripe type mapping table 1218 is an example of restoration from a failure in edges #0 and #1.

Data of the stripe type I and data of the stripe type H are lost in both of the two edge nodes. Data of the stripe type I and data of the stripe type H are therefore given high priority and restored quickly before data of other stripe types. Data of other stripe types, including the stripe types A, B, E, and G, is then restored.

Reliability can be improved also by executing restoration processing in advance in cases other than unpredictable failures, for example, a scheduled shutdown and the detection of a sign of a failure.

The storage functions in the embodiments described above can be made more efficient when combined with other storage functions. For instance, compression executed on the edge side reduces the amount of data transferred and accordingly reduces the storage capacity required to store data. Encryption executed on the edge side makes data transfer and data storage secure.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A distributed storage system, comprising:
an edge system comprising a plurality of edge nodes; and
a core system, which is coupled to the edge system via a network, and is configured to hold backup data of the edge system,
wherein each of the plurality of edge nodes is configured to:
provide a volume to a host;
generate a snapshot based on write data from the host,
generate XOR update differential data representing a differential between a first generation snapshot of the volume and an old generation snapshot of the volume, the old generation being older than the first generation;
transmit the generated XOR update differential data to the core system, and
wherein the core system is configured to:
hold, as the backup data, erasure codes generated based on pieces of XOR update differential data, the pieces of XOR update differential data being transmitted from different edge nodes;
update the erasure codes based on the pieces of XOR update differential data received from the different edge nodes, and
wherein each of the different edge nodes is configured to generate, and transmit to the core system, the XOR update differential data asynchronously with a write update made to the volume.

2. The distributed storage system according to claim 1, wherein the core system is configured to:
hold at least one volume in which the erasure codes are stored; and
set exclusive lock on an area in which an erasure code being updated is stored in the at least one volume.

3. The distributed storage system according to claim 1, wherein the core system is configured to store the pieces of XOR update differential data of a plurality of generations received sequentially from a first edge node among the different edge nodes.

4. The distributed storage system according to claim 1, wherein each of the plurality of edge nodes is configured to transmit an all-writes-complete notification to the core system after transmitting, to the core system, every piece of XOR update differential data representing a differential between the first generation snapshot and the old generation snapshot, and
wherein the core system is configured to update the erasure codes based on the XOR update differential data for which the all-writes-complete notification is received.

5. The distributed storage system according to claim 1, wherein each of the plurality of edge nodes is configured to:
select an address area updated between the old generation snapshot and the first generation snapshot; and
transmit XOR update differential data of the selected address area to the core system.

6. The distributed storage system according to claim 1, wherein the core system is configured to update, when XOR update differential data received in an update of erasure codes of one stripe is XOR update differential data of only some of data elements of the stripe, the erasure codes of the stripe, with zero data set as other data elements.

7. The distributed storage system according to claim 1, wherein the core system is configured to use, in restoration of a first volume of a first edge node among the plurality of edge nodes, an erasure code associated with the first volume, and a snapshot of an edge node different from the first edge node, which is associated with the erasure code.

8. The distributed storage system according to claim 1, wherein the core system is configured to generate erasure codes of a first stripe and a second stripe, which comprise common XOR update differential data, and
wherein, other than the common XOR update differential data, data elements in the first stripe and data elements in the second stripe are data elements of the different edge nodes.

9. The distributed storage system according to claim 1, wherein a number of the plurality of edge nodes is larger than a number of data elements in a stripe, and
wherein, when stripes each comprising at least two erasure codes comprise XOR update differential data from one edge node, a combination of edge nodes from which data elements of XOR update differential data are sent varies between the stripes.

10. A method of backing up data in a distributed storage system, the distributed storage system comprising:
an edge system comprising a plurality of edge nodes, the plurality of edge nodes configured to generate a snapshot based on write data from the host; and
a core system, which is coupled to the edge system via a network, and is configured to hold backup data of the edge system, the method comprising:
receiving, by the core system, from each of the plurality of edge nodes, XOR update differential data representing a differential between a first generation snapshot of a volume and an old generation snapshot of the volume, the old generation being older than the first generation; and
updating, by the core system, erasure codes, which are held as the backup data, by using pieces of XOR update differential data received from different edge nodes;
wherein each of the different edge nodes is configured to generate, and transmit to the core system, the XOR update differential data asynchronously with a write update made to the volume.

11. The method according to claim 10, further comprising storing, by the core system, pieces of XOR update differential data of a plurality of generations received sequentially from a first edge node among the plurality of edge nodes.

12. The method according to claim 10, further comprising updating, by the core system, when the pieces of XOR update differential data received in the update of erasure codes of one stripe is XOR update differential data of only some of data elements of the stripe, the erasure codes of the stripe, with zero data set as other data elements.

13. The backup method according to claim 10, further comprising using, by the core system, in restoration of a first volume of a first edge node among the plurality of edge nodes, an erasure code associated with the first volume, and a snapshot of an edge node different from the first edge node, which is associated with the erasure code associated with the first volume.

14. A computer-readable non-transitory storage medium having stored thereon a command for causing a core system in a distributed storage system to execute processing for data backup, the core system being coupled via a network to an edge system comprising a plurality of edge nodes, and holding backup data of the edge system, the processing comprising:
receiving, from each of the plurality of edge nodes, XOR update differential data representing a differential between a first generation snapshot of a volume and an old generation snapshot of the volume, the old generation being older than the first generation;
updating erasure codes, which are held as the backup data, by using pieces of XOR update differential data received from different edge nodes; and,
wherein each of the different edge nodes is configured to generate, and transmit to the core system, the XOR update differential data asynchronously with a write update made to the volume.

* * * * *